(12) United States Patent
Sato et al.

(10) Patent No.: US 8,404,370 B2
(45) Date of Patent: Mar. 26, 2013

(54) PERPENDICULAR MAGNETIC RECORDING MEDIUM AND METHOD OF MANUFACTURING THE SAME

(75) Inventors: Tokichiro Sato, Singapore (SG); Takahiro Onoue, Singapore (SG); Takenori Kajiwara, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/751,237

(22) Filed: Mar. 31, 2010

(65) Prior Publication Data

US 2010/0255348 A1    Oct. 7, 2010

(30) Foreign Application Priority Data

Mar. 31, 2009    (JP) ................. 2009-087763

(51) Int. Cl.
  *G11B 5/66* (2006.01)
(52) U.S. Cl. .................... 428/836.2; 427/128
(58) Field of Classification Search .............. None
  See application file for complete search history.

(56) References Cited

U.S. PATENT DOCUMENTS

| | | | |
|---|---|---|---|
| 2005/0058855 A1* | 3/2005 | Girt | 428/694 TS |
| 2006/0154113 A1* | 7/2006 | Watanabe et al. | 428/836.2 |
| 2006/0246323 A1 | 11/2006 | Liu et al. | |
| 2008/0062575 A1 | 3/2008 | Shimizu | |
| 2009/0242389 A1* | 10/2009 | Asakura et al. | 204/192.15 |
| 2010/0247963 A1* | 9/2010 | Kim et al. | 428/800 |
| 2010/0247964 A1* | 9/2010 | Onoue et al. | 428/800 |
| 2010/0270146 A1* | 10/2010 | Nonaka et al. | 204/298.13 |

FOREIGN PATENT DOCUMENTS

| | | |
|---|---|---|
| EP | 0479232 A1 | 4/1992 |
| JP | 2006-024346 A | 1/2006 |

OTHER PUBLICATIONS

T. Oikawa, et al., "Microstructure and Magnetic Properties of CoPtCr-SiO$_2$ Perpendicular Recording Media", IEEE Transactions on Magnetic, Sep. 2002, pp. 1976-1978, vol. 38, No. 5.
Search and Examination Report from Singapore Patent Application No. 201002262-2 dated Mar. 18, 2011, 16 pages.

* cited by examiner

*Primary Examiner* — Holly Rickman (57) ABSTRACT

A perpendicular magnetic recording medium 100 has, over a substrate, at least a magnetic recording layer 122 with a granular structure in which nonmagnetic grain boundaries are formed between magnetic grains continuously grown into a columnar shape. The magnetic grains of the magnetic recording layer 122 contain Co, Cr, and Pt. The magnetic recording layer 122 contains at least one oxide selected from a group A including $SiO_2$, $TiO_2$, and $Cr_2O_3$, at least one oxide selected from a group B consisting of oxides each having a larger Gibbs free energy $\Delta G$ than the group A, and a reducing agent adapted to reduce the oxides of the group B.

7 Claims, 5 Drawing Sheets

Amount of O to be discharged depending on contents of $Co_3O_4$ and SiO

FIG. 3

| | COMPOSITION | ADDITION AMOUNT OF $Co_3O_4$ | SNR | DIFFERENCE FROM REFERENCE VALUE |
|---|---|---|---|---|
| EXAMPLE | (89-x)(70Co-13Cr-17Pt)-5($SiO_2$)-5($TiO_2$)-x($Co_3O_4$)-1(SiO) | 0mol% (classed into Comparative Example) | 17.3 | 0 |
| | | 1mol% | 18.25 | 0.95 |
| | | 2mol% | 18.2 | 0.9 |
| | | 3mol% | 18.1 | 0.8 |
| | | 4mol% | 17.8 | 0.5 |
| | | 5mol% | 17.5 | 0.2 |
| COMPARATIVE EXAMPLE | (90-x)(70Co-13Cr-17Pt)-5($SiO_2$)-5($TiO_2$)-x($Co_3O_4$) | 0mol% | 17.6 | 0 |
| | | 1mol% | 18.2 | 0.6 |
| | | 2mol% | 18.1 | 0.5 |
| | | 3mol% | 17.2 | -0.4 |
| | | 4mol% | 17 | -0.6 |
| | | 5mol% | - | - |

PERPENDICULAR MAGNETIC RECORDING MEDIUM AND METHOD OF MANUFACTURING THE SAME

This application is based upon and claims the benefit of priority from Japanese Patent Application No. 2009-087763, filed on Mar. 31, 2009, the disclosure of which is incorporated herein in its entirety by reference.

TECHNICAL FIELD

This invention relates to a perpendicular magnetic recording medium adapted to be mounted in a perpendicular magnetic recording HDD (hard disk drive) or the like and further relates to a method of manufacturing the same.

BACKGROUND ART

Various information recording techniques have been developed following the increase in volume of information processing in recent years, Particularly, the areal recording density of a HDD using the magnetic recording technique has been increasing at an annual rate of about 100%. Recently, the information recording capacity exceeding 200 GB has been required per 2.5-inch magnetic recording medium adapted for use in a HDD or the like. In order to satisfy such a requirement, it is necessary to realize an information recording density exceeding 400 Gbits/inch$^2$.

In order to achieve the high recording density in a magnetic recording medium for use in a HDD or the like, the perpendicular magnetic recording system has been proposed in recent years. In a perpendicular magnetic recording medium for use in the perpendicular magnetic recording system, the easy magnetization axis of a magnetic recording layer is adjusted so as to be oriented in a direction perpendicular to the surface of a substrate. As compared with the conventional in-plane magnetic recording system, the perpendicular magnetic recording system can suppress a so-called thermal fluctuation phenomenon in which the thermal stability of a recorded signal is degraded due to superparamagnetism so that the recorded signal is lost, and thus is suitable for increasing the recording density.

As the perpendicular magnetic recording medium for use in the perpendicular magnetic recording system, a CoCrPt—SiO$_2$ perpendicular magnetic recording medium (see T. Oikawa et. al., IEEE Trans. Magn, vol. 38, 1976-1978 (2002)) is proposed because it exhibits high thermal stability and excellent recording characteristics. In this CoCrPt—SiO$_2$ perpendicular magnetic recording medium, a magnetic recording layer has a granular structure in which nonmagnetic grain boundaries where SiO$_2$ is segregated are formed between magnetic grains in the form of continuously grown columnar Co crystals with a hcp (hexagonal closest packed) structure, thereby achieving both miniaturization of the magnetic grains and an improvement in coercive force Hc. It is known that an oxide is used for forming nonmagnetic grain boundaries (nonmagnetic portions between magnetic grains), and it is proposed to use, for example, one of SiO$_2$, Cr$_2$O$_3$, TiO, TiO$_2$, and Ta$_2$O$_5$ (JP-A-2006-024346).

SUMMARY OF THE INVENTION

Although the magnetic recording medium has been increased in recording density as described above, a further improvement in recording density is required for the future. As factors important for the increase in recording density, there are an improvement in magnetostatic properties such as coercive force Hc and reversed domain nucleation magnetic field Hn and an improvement in electromagnetic conversion characteristics such as overwrite characteristics (OW characteristics), SNR (signal-to-noise ratio), and track width narrowing. Among them, the improvement in SNR is important for accurate and high-speed reading and writing even in small-area recording bits.

The improvement in SNR is performed mainly by reducing noises in a magnetized transition area of a magnetic recording layer. Effective elements for reducing the noises include improving the crystal orientation of the magnetic recording layer, miniaturization of diameter of the magnetic grains, and isolation of the magnetic grains. Among them, acceleration of the isolation of the magnetic grains interrupts the magnetic interaction between adjacent magnetic grains and it is therefore possible to greatly reduce the noises and to remarkably improve the SNR. The above-mentioned perpendicular magnetic recording medium having the granular structure makes the SNR improve to isolate and miniaturize the magnetic grains by forming grain boundaries by oxides.

However, the indiscriminate acceleration of isolation of the magnetic grains is in danger of degradation of the crystal orientation of the magnetic recording layer. If the crystal orientation of the magnetic recording layer is degraded, it is impossible to achieve the improvement of SNR that is originally objective. In the manner which is described above, in order to further achieve an increase in recording density of the magnetic recording medium, the establishment of a new technique presents a challenge to make compatibility between the attainment of high coercive force Hc and a further improvement of SNR.

Under these circumstances, it is an object of this invention to provide a perpendicular magnetic recording medium that can achieve an improvement in SNR of a magnetic recording layer, thereby achieving a further increase in recording density, and further to provide a method of manufacturing such a perpendicular magnetic recording medium.

As a result of intensive studies for achieving the above-mentioned object, the present inventors have paid attention to the fact that the amount of oxygen ought to be contained as an oxide is small according to a component analysis of a magnetic recording layer. Herein, it is unclear as to whether the oxide is decomposed into an element such as Si or Ti and oxygen during sputtering or oxygen is deficient in a target from the beginning. At any rate, if oxygen is deficient in the formed magnetic recording layer, it means that the excess element exists as simple atoms. Then, it is considered that the atoms existing as a simple substance are not expelled to grain boundaries but entrapped into magnetic grains when Co is crystallized. It is further considered that there is a possibility that, as a result of it, the crystal orientation of the magnetic grains is degraded to reduce the SNR.

As a result of further studies, the present inventors have found that, by adding oxygen to supplement the deficiency, the element existing as a simple substance can be formed into an oxide and segregated at the grain boundaries as originally expected. Then, a perpendicular magnetic recording medium was manufactured by incorporating an oxidizing agent as a component of a magnetic recording layer and the SNR thereof was evaluated.

However, it has been found that although the SNR of the perpendicular magnetic recording medium using the above-mentioned technique is once improved following an improvement in crystal orientation of magnetic grains due to the incorporation of the oxidizing agent, it starts to decrease when the crystal orientation reaches a certain level. As a result of closely examining the perpendicular magnetic recording medium for locating the cause of it, it has been considered that since the amount of oxygen in the magnetic grains changes significantly, an oxygen excessive state appears this time, thus leading to the reduction in SNR as a result.

However, only by changing the incorporation amount of the oxidizing agent, it has been extremely difficult to finely adjust the addition amount of oxygen. Therefore, in order to add the proper amount of oxygen, the present inventors have continued further studies and, as a result, have completed this invention.

According to this invention, there is provided a perpendicular magnetic recording medium having, over a substrate, at least a magnetic recording layer with a granular structure in which a nonmagnetic grain boundary is formed between magnetic grains continuously grown into a columnar shape, wherein the magnetic grains contain Co, Cr, and Pt, and the magnetic recording layer contains at least one oxide selected from a group A comprising $SiO_2$, $TiO_2$, and $Cr_2O_3$, at least one oxide selected from a group B consisting of oxides each having a larger Gibbs free energy $\Delta G$ than the group A, and at least one oxide selected from a group C consisting of oxides each having a smaller Gibbs free energy $\Delta G$ than the group B.

According to the above-mentioned configuration, the magnetic recording layer is formed by containing the oxide (group B) having a larger Gibbs free energy $\Delta G$ than the oxide (group A) adapted to be contained in the grain boundary of the magnetic recording layer. The oxide (group C) serving as the reducing agent is further contained for controlling the amount of oxygen of the group B adapted to oxidize the group A. Therefore, it is possible to improve the miniaturization, isolation, and electromagnetic conversion characteristics of the magnetic grains by the oxide of the group A and, even if oxygen deficiency occurs in the oxide of the group A, the oxide of the group B serves as an oxidizing agent to supplement the oxygen deficiency. Further, by the reducing agent in the form of the oxide (group C) having a smaller Gibbs free energy $\Delta G$ than the oxide of the group B, it is possible to adjust the amount of oxygen to be supplied from the group B to the group A, more finely than by changing the incorporation amount of the group B itself. Accordingly, by securely expelling the element of the oxide of the group A from the magnetic grains (depositing the element of the oxide of the group A at the grain boundary) to prevent degradation of the crystal orientation of the magnetic grains otherwise caused by the oxide remaining in the crystals of the magnetic grains, it is possible to provide a perpendicular magnetic recording medium that can achieve an improvement in SNR of the magnetic recording layer, thereby achieving a further increase in recording density.

The oxide of the group C preferably has a composition in which oxygen is deficient from the oxide adapted to be contained in the grain boundary. According to this configuration, even if the magnetic recording layer is formed by incorporating the reducing agent, the reducing agent is deposited at the grain boundary without being entrapped into the crystals of the magnetic grains. Therefore, it is possible to properly adjust the amount of oxygen without affecting the crystal orientation of the magnetic grains.

The relationship between the groups A and B and the relationship between the groups B and C are each a relationship in Gibbs free energy $\Delta G$. There is no limitation in magnitude between the groups A and C. On the other hand, in the relationship between the groups B and C, the oxygen number in a molecule preferably differs between the oxide of the group B and the oxide of the group C. This makes it possible to finely adjust the final number of oxygen when the oxide of the group B or C is added per unit amount (e.g. unit mol %).

For example, when the oxide of the group B is $Co_3O_4$ with an oxygen number of 4 and the oxide of the group C is SiO with an oxygen number of 1, part of oxygen largely increased in number by $Co_3O_4$ can be reduced little by little by SiO.

The oxide of the group C may preferably be each at least one compound selected from a group comprising SiO, TiO, $Cr_2O_2$, and $Cr_3O_3$. Si, Ti, and Cr are the elements included in the group A. The element of the group A is expelled to the grain boundary of the magnetic recording layer. Accordingly, it is possible to prevent degradation of the crystal orientation of the magnetic grains otherwise caused by the reducing agent entrapped in the magnetic grains and thus to supply the reducing agent while ensuring the SNR of the magnetic recording layer.

The oxides of the group B may preferably be each at least one compound selected from a group comprising CoO, $Co_3O_4$, CuO, $Ag_2O$, and $WO_3$. Even if entrapped in the crystals of the magnetic grains, the element of such an oxide does not degrade the crystal orientation of the magnetic grains. Therefore, it is possible to supply oxygen while ensuring the SNR of the magnetic recording layer.

Preferably, the magnetic recording layer is made of $CoCrPt$—$TiO_2$—$SiO_2$—$Co_3O_4$—$SiO$. According to this configuration, the miniaturization and isolation of CoCrPt being the magnetic grains can be facilitated by $SiO_2$ and, further, the electromagnetic conversion characteristics (particularly, SNR) can be improved by $TiO_2$. Further, by $Co_3O_4$, it is possible to supply oxygen to $SiO_2$ and $TiO_2$ without degrading the crystal orientation of CoCrPt and, further, since SiO serves as a reducing agent for $Co_3O_4$, it is possible to finely adjust the amount of oxygen while ensuring the crystal orientation of the magnetic grains. This makes it possible to provide a perpendicular magnetic recording medium improved in SNR.

According to this invention, there is also provided a perpendicular magnetic recording medium manufacturing method comprising forming a magnetic recording layer over a substrate by the use of a target containing a metal containing Co, Cr, and Pt, at least one oxide selected from a group A comprising $SiO_2$, $TiO_2$, and $Cr_2O_3$, at least one oxide selected from a group B consisting of oxides each having a larger Gibbs free energy $\Delta G$ than the group A, and at least one oxide selected from a group C consisting of oxides each having a smaller Gibbs free energy $\Delta G$ than the group B.

The components and the explanation thereof based on the technical idea of the perpendicular magnetic recording medium described above are also applicable to the method of manufacturing such a perpendicular magnetic recording medium.

EFFECT OF THE INVENTION

According to this invention, it is possible to provide a perpendicular magnetic recording medium that can achieve an improvement in SNR of a magnetic recording layer, thereby achieving a further increase in recording density, and further to provide a method of manufacturing such a perpendicular magnetic recording medium.

MODE FOR CARRYING OUT THE INVENTION

Hereinbelow, a preferred embodiment of this invention will be described in detail with reference to the accompanying drawings. Sizes, materials, specific numerical values, and so on shown in the embodiment are only for illustrative purposes for facilitating understanding of the invention and are not intended to limit this invention unless otherwise specified. In this specification and the drawings, components having substantially the same functions and structures are assigned the same symbols to thereby omit duplicate explanation and, further, illustration of components that is not directly related to this invention is omitted.

Embodiment

[Perpendicular Magnetic Recording Medium]

Figure 1:
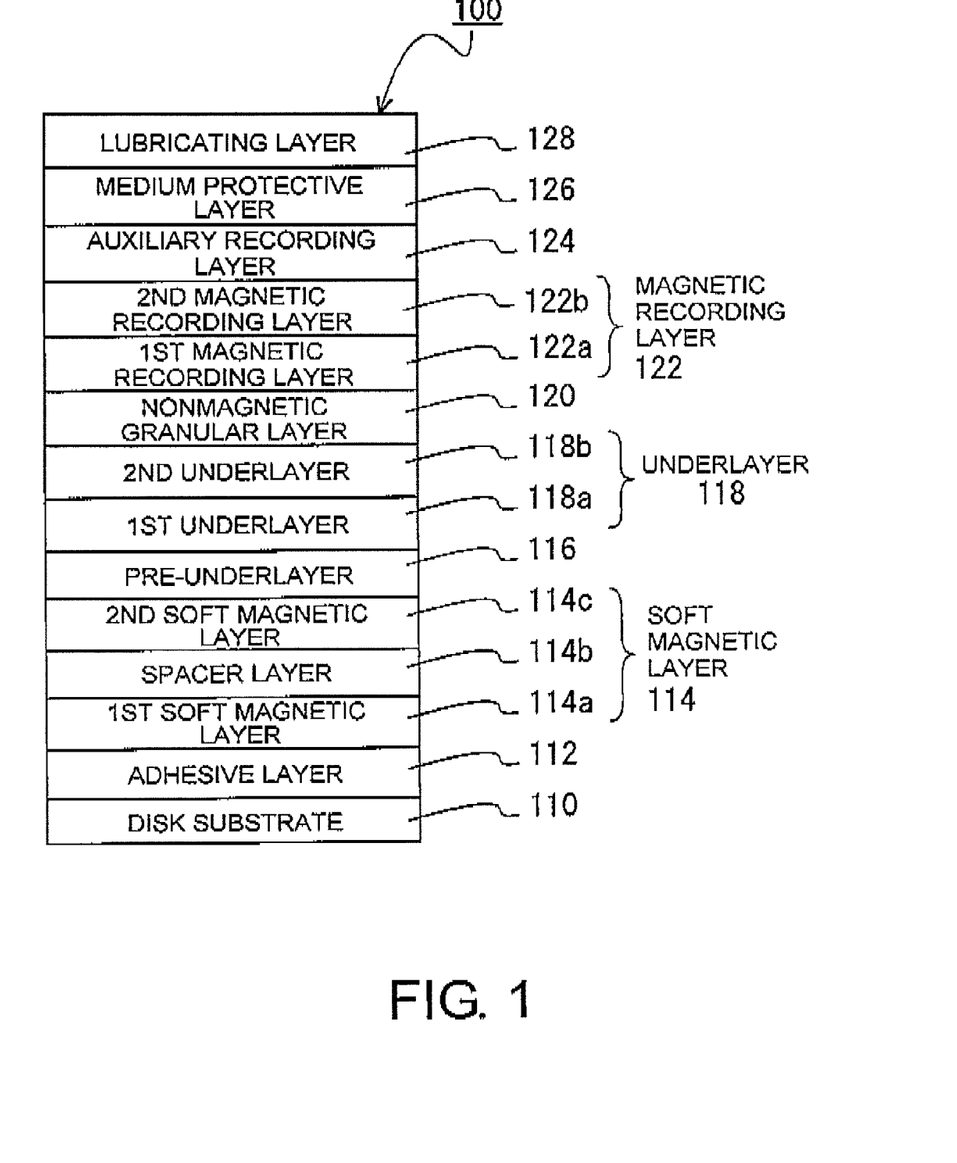
FIG. 1 is a diagram for explaining the structure of a perpendicular magnetic recording medium according to an embodiment of this invention.

FIG. 1 is a diagram for explaining the structure of a perpendicular magnetic recording medium 100 according to this embodiment. The perpendicular magnetic recording medium 100 shown in FIG. 1 comprises a disk substrate 110, an adhesive layer 112, a first soft magnetic layer 114a, a spacer layer 114b, a second soft magnetic layer 114c, a pre-underlayer 116, a first underlayer 118a, a second underlayer 118b, a nonmagnetic granular layer 120, a first magnetic recording layer 122a, a second magnetic recording layer 122b, an auxiliary recording layer 124, a protective layer 126, and a lubricating layer 128. The first soft magnetic layer 114a, the spacer layer 114b, and the second soft magnetic layer 114c cooperatively form a soft magnetic layer 114. The first underlayer 118a and the second underlayer 118b cooperatively form an underlayer 118. The first magnetic recording layer 122a and the second magnetic recording layer 122b cooperatively form a magnetic recording layer 122.

As the disk substrate 110, use can be made of a glass disk obtained by molding an amorphous aluminosilicate glass into a disk shape by direct press. The kind, size, thickness, and so on of the glass disk are not particularly limited. As a material of the glass disk, use can be made of, for example, aluminosilicate glass, soda-lime glass, soda aluminosilicate glass, aluminoborosilicate glass, borosilicate glass, quartz glass, chain silicate glass, glass ceramic such as crystallized glass, or the like. This glass disk is ground, polished, and chemically strengthened in sequence, thereby obtaining the smooth nonmagnetic disk substrate 110 in the form of a chemically strengthened glass disk.

On the disk substrate 110, the layers from the adhesive layer 112 to the auxiliary recording layer 124 are formed in sequence by a DC magnetron sputtering method. The protective layer 126 can be formed by a CVD method. Thereafter, the lubricating layer 128 can be formed by a dip coating method. In terms of high productivity, it is also preferable to use an in-line type film forming method. Hereinbelow, the structures of the respective layers will be described.

The adhesive layer 112 is formed in contact with the disk substrate 110. The adhesive layer 112 has a function of increasing the adhesion strength between the soft magnetic layer 114 formed thereon and the disk substrate 110 and a function of miniaturizing and equalizing crystal grains of the respective layers formed over the adhesive layer 112. When the disk substrate 110 is made of amorphous glass, the adhesive layer 112 is preferably an amorphous alloy film for adaptation to the amorphous glass surface.

The adhesive layer 112 can be selected from, for example, a CrTi-based amorphous layer, a CoW-based amorphous layer, a CrW-based amorphous layer, a CrTa-based amorphous layer, and a CrNb-based amorphous layer. Among them, a CoW-based alloy film is particularly preferable because it forms an amorphous metal film containing microcrystals. The adhesive layer 112 may be a single layer made of a single material, but, alternatively, may be formed by laminating a plurality of layers. For example, a CoW layer or a CrW layer may be formed on a CrTi layer. Preferably, the adhesive layer 112 is formed by sputtering a material containing carbon dioxide, carbon monoxide, nitrogen, or oxygen or is exposed to such a gas at its surface layer.

The soft magnetic layer 114 is a layer that temporarily forms a magnetic path during recording for causing the magnetic flux to pass through the recording layer in a perpendicular direction in the perpendicular magnetic recording system. By interposing the nonmagnetic spacer layer 114b between the first soft magnetic layer 114a and the second soft magnetic layer 114c, the soft magnetic layer 114 can be configured to have AFC (antiferromagnetic exchange coupling). With this configuration, magnetization directions of the soft magnetic layer 114 can be aligned along the magnetic path (magnetic circuit) with high accuracy and thus the perpendicular component in the magnetization direction is extremely reduced, so that it is possible to reduce noise generated from the soft magnetic layer 114. As the composition of the first soft magnetic layer 114a and the second soft magnetic layer 114c, use can be made of a cobalt-based alloy such as CoTaZr, a Co—Fe-based alloy such as CoCrFeB or CoFeTaZr, a Ni—Fe-based alloy like a [Ni—Fe/Sn]n multilayer structure, or the like.

The pre-underlayer 116 is a nonmagnetic alloy layer and has a function of protecting the soft magnetic layer 114 and a function of orienting, in a disk perpendicular direction, the easy magnetization axis of a hexagonal closest packed structure (hcp structure) included in the underlayer 118 formed thereon. It is preferable that, in the pre-underlayer 116, the (111) plane of a face-centered cubic structure (fcc structure) be parallel to the main surface of the disk substrate 110. The pre-underlayer 116 may have a structure in which such a crystal structure and an amorphous structure are mixed. As a material of the pre-underlayer 116, it can be selected from Ni, Cu, Pt, Pd, Zr, Hf, Nb, and Ta. Alternatively, it may be an alloy containing such a metal as a main component and one or more additional elements from Ti, V, Cr, Mo, and W. For example, it is possible to suitably select NiW, CuW, or CuCr as an alloy having a fcc structure.

The underlayer 118 has a hcp structure and has a function of growing Co crystals with a hcp structure of the magnetic recording layer 122 into a granular structure. Therefore, as the crystal orientation of the underlayer 118 is enhanced, i.e. as the (0001) plane of crystals of the underlayer 118 becomes more parallel to the main surface of the disk substrate 110, it is possible to improve the orientation of the magnetic recording layer 122. A material of the underlayer 118 is typically Ru, but, alternatively, can be selected from RuCr and RuCo. Since Ru takes a hcp structure and has a crystal lattice interval close to that of Co, the magnetic recording layer 122 composed mainly of Co can be well oriented.

In the case where the material of the underlayer 118 is Ru, the underlayer 118 can have a two-layer structure made of Ru by changing the gas pressure during sputtering. Specifically, when forming the first underlayer 118a on the lower layer side, the gas pressure of Ar is set to a predetermined pressure, i.e. a low pressure, while when forming the second underlayer 118b on the upper layer side, the gas pressure of Ar is set higher than that for forming the first underlayer 118a on the lower layer side, i.e. set to a high pressure. This makes it possible to improve the crystal orientation of the magnetic recording layer 122 by the first underlayer 118a and to miniaturize magnetic grains of the magnetic recording layer 122 by the second underlayer 118b.

As the gas pressure increases, the mean free path of sputtering plasma ions decreases and thus the film forming rate decreases to make the film coarse, so that it is possible to facilitate separation and miniaturization of Ru crystal grains and thus to miniaturize the Co crystal grains.

A very small amount of oxygen may be added to Ru of the underlayer 118. This makes it possible to further facilitate the separation and miniaturization of the Ru crystal grains and thus to achieve further isolation and miniaturization of the Co crystal grains of the magnetic recording layer 122. Oxygen may be added by reactive sputtering, but it is preferable to use a target containing oxygen in sputtering film formation.

The nonmagnetic granular layer 120 is a nonmagnetic layer having a granular structure. By forming the nonmagnetic granular layer 120 on the hcp crystal structure of the underlayer 118 and by growing a granular layer of the first magnetic recording layer 122a (or the magnetic recording layer 122) thereon, the nonmagnetic granular layer 120 has a function of separating the magnetic granular layer from an initial growth stage (buildup). By this, it is possible to facilitate isolation of the magnetic grains of the magnetic recording layer 122. The composition of the nonmagnetic granular layer 120 can have a granular structure by segregating a nonmagnetic substance to form grain boundaries between nonmagnetic crystal grains made of a Co-based alloy.

In this embodiment, the nonmagnetic granular layer 120 is made of CoCr—$SiO_2$. Accordingly, $SiO_2$ (nonmagnetic substance) is segregated to form grain boundaries between Co-based alloy crystal grains (nonmagnetic crystal grains) so that the nonmagnetic granular layer 120 has a granular structure. CoCr—$SiO_2$ is only one example and may be replaced by another. For example, CoCrRu—$SiO_2$ can be suitably used instead. Further, instead of Ru, use can be made of Rh (rhodium), Pd (palladium), Ag (silver), Os (osmium), Ir (iridium), or Au (gold). The nonmagnetic substance may be any substance as long as it is a substance that can form grain boundaries around magnetic grains so as to suppress or block the exchange interaction between the magnetic grains and that may be a nonmagnetic substance which is not solid-soluble to cobalt (Co). For example, silicon oxide (SiOx), chromium (Cr), chromium oxide ($CrO_2$), titanium oxide ($TiO_2$), zirconium oxide ($ZrO_2$), and tantalum oxide ($Ta_2O_5$) can be given as examples.

In this embodiment, the nonmagnetic granular layer 120 is provided on the underlayer 118 (second underlayer 118b), but not limited thereto. The perpendicular magnetic recording medium 100 can be fabricated without providing the nonmagnetic granular layer 120.

The magnetic recording layer 122 has a columnar granular structure in which a nonmagnetic substance is segregated to form grain boundaries around magnetic grains of a hard magnetic substance selected from a Co-based alloy, a Fe-based alloy, and a Ni-based alloy, By providing the nonmagnetic granular layer 120, these magnetic grains can be epitaxially grown continuously from the granular structure thereof. The magnetic recording layer 122 may be a single layer but, in this embodiment, is formed by the first magnetic recording layer 122a and the second magnetic recording layer 122b having mutually different compositions and thicknesses. The first magnetic recording layer 122a is small in thickness but secures a coercive force Hc by increasing the size of magnetic grains with a relatively small amount of oxides. The second magnetic recording layer 122b serving as a main recording layer has a large thickness to secure a coercive force Hc and contains a relatively large amount of oxides to achieve isolation and miniaturization of magnetic grains, thereby achieving an improvement in SNR.

In this embodiment, the first magnetic recording layer 122a may be made of (CoCrPt)—($Cr_2O_5$) or (CoCrPt)—($Cr_2O_5$)—($SiO_2$). Their compositions can form a granular structure in which $Cr_2O_5$ and $SiO_2$ (oxides) being nonmagnetic substances are segregated to form grain boundaries around magnetic grains made of CoCrPt and grown into a columnar shape. These magnetic grains are epitaxially grown continuously from the granular structure of the nonmagnetic granular layer 120. As the nonmagnetic substances for forming the nonmagnetic grain boundaries of the first magnetic recording layer 122a, oxides such as silicon oxide (SiOx), chromium (Cr), chromium oxide ($Cr_xO_y$), titanium oxide ($TiO_2$), zirconium oxide ($ZrO_2$), tantalum oxide ($Ta_2O_5$), iron oxide ($Fe_2O_3$), and boron oxide ($B_2O_3$) can be given as examples. A nitride such as BN and a carbide such as $B_4C_3$ can also be suitably used.

The second magnetic recording layer 122b contains, as nonmagnetic substances, at least one oxide selected from a group A including $SiO_2$, $TiO_2$, and $Cr_2O_3$ and at least one oxide selected from a group B including oxides, such as CoO, $Co_3O_4$, CuO, $Ag_2O$, and $WO_3$, each having a larger Gibbs free energy $\Delta G$ (hereinafter simply referred to as $\Delta G$) than the group A. As a specific example, (CoCrPt)—($TiO_2$)—($SiO_2$)—($Co_3O_4$) can be used. Also in the second magnetic recording layer 122b, a granular structure can be formed in which $TiO_2$ and $SiO_2$ (composite oxides) being nonmagnetic substances are segregated to form grain boundaries around magnetic grains made of CoCrPt and grown into a columnar shape. $Co_3O_4$ being the oxide of the group B is separated into Co and O, wherein Co enters the magnetic grains (not discharged from the magnetic grains) and O supplements oxygen deficiency in $SiO_2$ and $TiO_2$ being the oxides of the group A.

The second magnetic recording layer 122b further contains an oxide (reducing agent) of a group C adapted to reduce the above-mentioned oxide of the group B. As the oxide of the group C forming the reducing agent, use can be made of a compound whose $\Delta G$ for oxygen is smaller than that of the oxide of the group B, such as, for example, SiO, TiO, $Cr_2O_2$, or $Cr_3O_3$, i.e. a compound having a composition in which oxygen is deficient from the oxide adapted to be contained in the grain boundaries. That is, the second magnetic recording layer 122b is formed by using a target containing a metal containing Co, Cr, and Pt, at least one oxide selected from the group A including $SiO_2$: $TiO_2$, and $Cr_2O_3$, at least one oxide selected from the group B including oxides each having larger $\Delta G$ than the group A, and at least one oxide selected from the group C including oxides each having smaller $\Delta G$ than the group B.

Accordingly, when the reducing agent obtains oxygen, its composition becomes the same as that of the oxide present at the grain boundaries and thus the predetermined function as a magnetic recording layer is not degraded. The reducing agent is bonded to oxygen (reduction) separated from the oxide of the group B so that it is possible to adjust the amount of oxygen to be supplied from the group B to the group A, more finely than by changing the incorporation amount of the group B itself. Further, since the element adapted to form the grain boundaries is used as the reducing agent, the reducing agent bonded to O is discharged from the magnetic grains so that it is possible to prevent degradation of the crystal orientation of the magnetic grains otherwise caused by the oxide remaining in the crystals of the magnetic grains.

Figure 2:
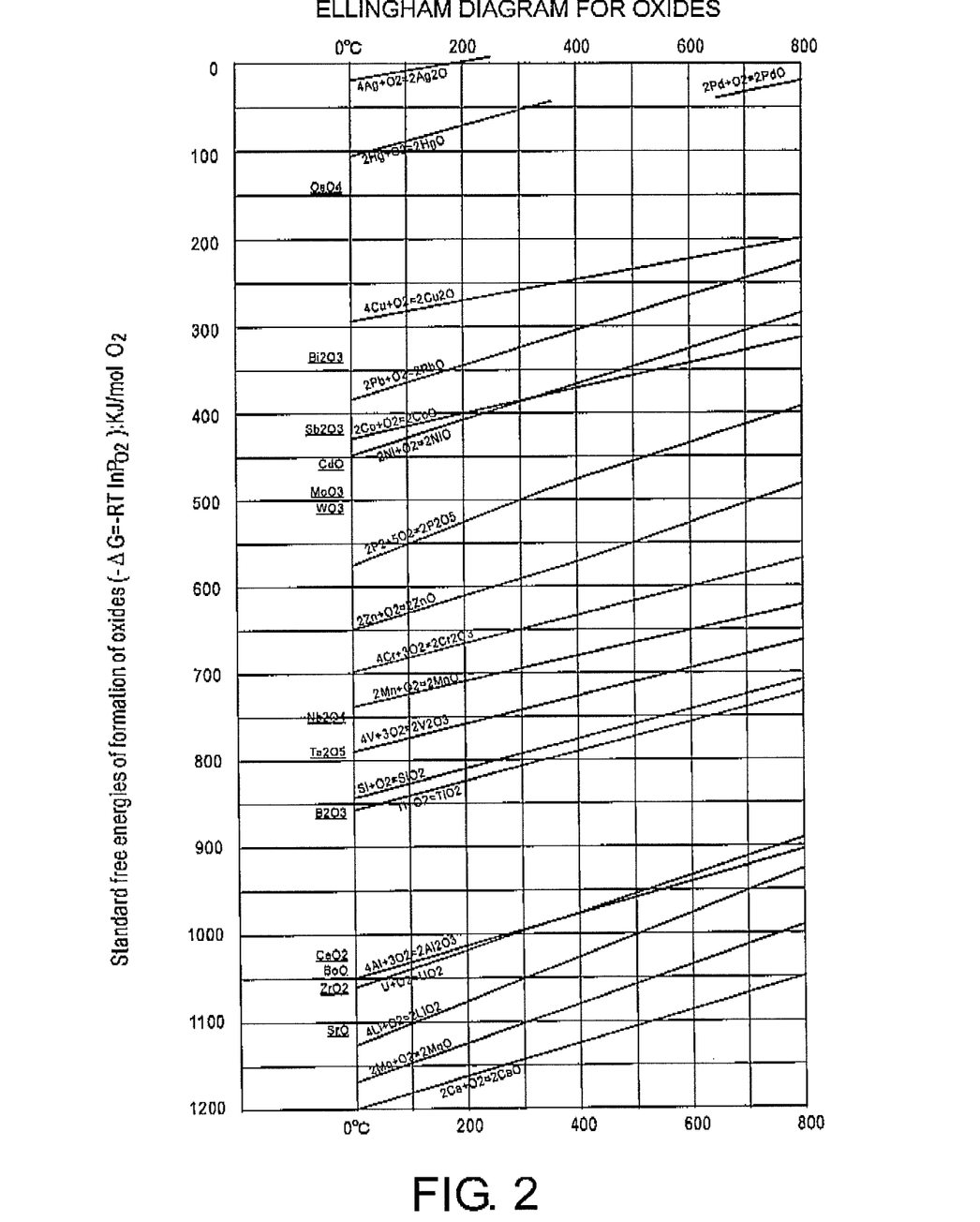
FIG. 2 is an Ellingham diagram showing free energies of formation of oxides.

FIG. 2 is an Ellingham diagram showing free energies of formation of oxides. As shown in FIG. 2, the oxides of the group B (oxidizing agents) are required to have larger ΔG than $SiO_2$, $TiO_2$, $Cr_2O_3$, $ZrO_2$, $Ta_2O_5$, and $B_2O_3$ being the oxides (group A) each useful for forming the grain boundaries of the magnetic recording layer. Further, there is a possibility that the element of the oxide of the group B is discharged as simple atoms and entrapped into the magnetic grains. Accordingly, although the oxide of the group B is not required to improve the properties of the magnetic recording layer as an oxide, a selection should be made such that even if a simple element is entrapped into the magnetic grains, the crystal orientation thereof is not degraded. As a result of examining various oxides, it has been found that an element of an oxide of the group B can be any one of Co, Cu, Ag, W, and Ge.

As the oxide of the group B, a selection can be made from CoO, $Co_3O_4$, CuO, $Ag_2O$, and $WO_3$. In this case, one or more oxides can be selected from them. As the oxides of the group A, oxides such as silicon oxide ($SiO_x$), chromium (Cr), chromium oxide ($Cr_xO_y$), titanium oxide ($TiO_2$), zirconium oxide ($ZrO_2$), tantalum oxide ($Ta_2O_5$), iron oxide ($Fe_2O_3$), and boron oxide ($B_2O_3$) can be given as examples like the oxides of the first magnetic recording layer 122a. Among them, it is preferable to contain $SiO_2$, $TiO_2$, or $Cr_2O_3$.

The reducing agent of the group C is required to have smaller ΔG than the group B. This is because it is necessary to ensure the function of the group B as an oxidizing agent for the group A. Further, a selection should be made such that the reducing agent of the group C bonded to oxygen does not affect the crystal orientation of the magnetic grains. As a result of examination taking this into account, it has been found that a compound as the reducing agent of the group C can be selected from the oxides including SiO, TiO, $Cr_2O_2$, and $Cr_3O_3$. Si, Ti, and Cr are the elements included in the group A. The element of the group A is expelled to the grain boundaries of the magnetic recording layer. Therefore, it is possible to prevent degradation of the crystal orientation of the magnetic grains otherwise caused by the reducing agent entrapped in the magnetic grains and thus to supply the reducing agent while ensuring the SNR.

It is preferable that the oxygen number deficient in the reducing agent of the group C (e.g. the oxygen number deficient in SiO with respect to $SiO_2$ is 1) be smaller than the oxygen number of the oxide of the group B as an oxidizing agent (e.g. in the case of $Co_3O_4$, the oxygen number is 4). This makes it possible to more properly adjust the amount of oxygen to be finally separated.

Figure 3:
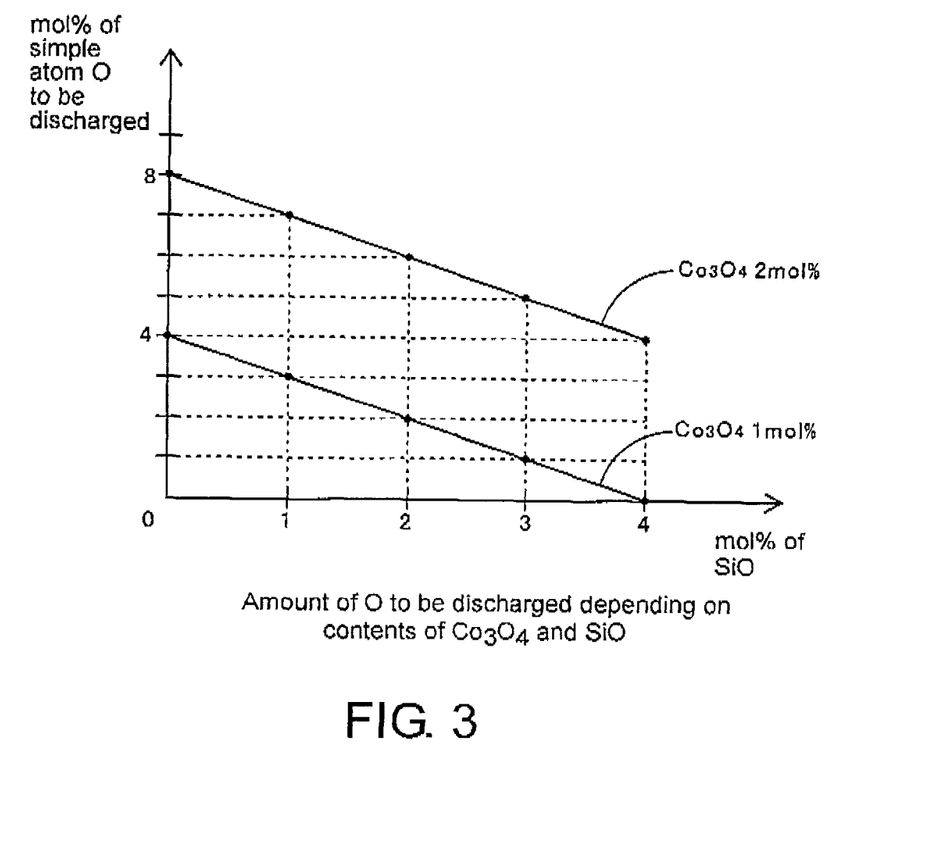
FIG. 3 is a diagram for explaining the amount of simple element oxygen to be discharged when an oxidizing agent and a reducing agent are mixed together.

FIG. 3 is a diagram for explaining the amount of simple element oxygen to be discharged when an oxidizing agent and a reducing agent are mixed together. It is assumed that the oxidizing agent (oxide of group B) is $Co_3O_4$ and the reducing agent is SiO. In this case, assuming that 1 mol % $Co_3O_4$ is added and all oxygen is separated, 4 mol % simple atom oxygen is discharged. Then, if the addition amount of SiO as the reducing agent is increased per 1 mol % from 0 mol %, since SiO captures oxygen so as to be $SiO_2$, it is seen that the amount of simple atom oxygen to be discharged decreases per 1 mol %. Actually, separation and bonding are not completely carried out and thus the numerical values are only illustrative. But still, it is true that excess simple atom oxygen can be captured.

In this embodiment, use is made of one kind of oxide in the first magnetic recording layer 122a and of the oxides of the groups A and B and the reducing agent in the second magnetic recording layer 122b, but not limited thereto. It is possible to use the oxides of the groups A and B and the reducing agent in either or both of the first magnetic recording layer 122a and the second magnetic recording layer 122b. Therefore, in the case where the magnetic recording layer 122 is formed by a single layer as is different from this embodiment, such a magnetic recording layer 122 is preferably made of CoCrPt—$TiO_2$—$SiO_2$—$Co_3$—SiO.

The auxiliary recording layer 124 is a magnetic layer magnetically almost continuous in the in-plane direction of the main surface of the substrate. It is necessary that the auxiliary recording layer 124 be adjacent to or in vicinity to the magnetic recording layer 122 so as to have a magnetic interaction therewith. A material of the auxiliary recording layer 124 may be, for example, CoCrPt, CoCrPtB, or a substance containing a very small amount of an oxide in CoCrPt or CoCrPtB. The auxiliary recording layer 124 has the purpose of adjusting the reversed domain nucleation magnetic field Hn and the coercive force Hc, thereby achieving an improvement in anti-thermal fluctuation characteristics, OW characteristics, and SNR. In order to achieve this purpose, the auxiliary recording layer 124 preferably has high perpendicular magnetic anisotropy Ku and high saturation magnetization Ms. The auxiliary recording layer 124 is provided above the magnetic recording layer 122 in this embodiment, but may alternatively be provided below the magnetic recording layer 122.

A term of "magnetically continuous" means that the magnetism continues. A term of "almost continuous" means to include the case where the auxiliary recording layer 124 is not a single magnet when observed in its entirety so that the magnetism may be discontinuous due to grain boundaries of crystal grains or the like. The grain boundary not only represents the discontinuity of a crystal, but also may be formed by segregation of Cr or by segregation of an oxide contained in a very small amount. Even if grain boundaries containing the oxide are formed in the auxiliary recording layer 124, the area of the grain boundaries is preferably smaller (the content of the oxide is lower) than that of the grain boundaries of the magnetic recording layer 122. The function and operation of the auxiliary recording layer 124 are not necessarily clear, but it is considered that the auxiliary recording layer 124 has a magnetic interaction (performs exchange coupling) with the granular magnetic grains of the magnetic recording layer 122 so that it is possible to adjust Hn and Hc and thus to improve the anti-thermal fluctuation characteristics and the SNR. Further, it is considered that since the area of the crystal grains (crystal grains having a magnetic interaction) connected to the granular magnetic grains is greater than cross section of the granular magnetic grains, magnetization reversal tends to occur due to reception of much magnetic flux from a magnetic head, thereby improving the OW characteristics of the whole.

The protective layer 126 can be formed by film formation of carbon by the CVD method while maintaining a vacuum. The protective layer 126 is a layer for protecting the perpendicular magnetic recording medium 100 from an impact of a magnetic head. Since, in general, carbon formed into a film by the CVD method is improved in film hardness as compared with that by the sputtering method, it is possible to protect the perpendicular magnetic recording medium 100 more effectively against the impact from the magnetic head.

The lubricating layer 128 can be formed of PFPE (perfluoropolyether) by the dip coating method. PFPE has a long chain molecular structure and is bonded to N atoms on the surface of the protective layer 126 with high affinity. By the function of this lubricating layer 128, even if the magnetic head is brought into contact with the surface of the perpendicular magnetic recording medium 100, it is possible to prevent damage or breakage of the protective layer 126.

By the above-mentioned manufacturing processes, the perpendicular magnetic recording medium 100 can be obtained. Next, the magnetic recording layer 122 being the feature of this invention will be described in further detail.

As described above, the magnetic recording layer 122 (second magnetic recording layer 122) contains the Co-based alloy, at least one oxide selected from the group A including $SiO_2$, $TiO_2$, and $Cr_2O_3$, at least one oxide selected from the group B including the oxides each having larger ΔG than the group A, and the reducing agent adapted to reduce the oxide of the group B.

In other words, the magnetic recording layer 122 is formed by containing the oxide (group B) having larger ΔG than the oxide (group A) adapted to be contained in the grain boundaries of the magnetic recording layer 122 and the reducing agent having smaller ΔG than the group B. Larger ΔG means that an element and oxygen tend to be separated from each other, while smaller ΔG means that an element and oxygen tend to form a stable oxide. Accordingly, if sputtering is carried out with the oxides of the groups A and B and the reducing agent mixed together, since the oxide of the group A tends to be oxidized more than the oxide of the group B, the oxide of the group B is reduced and the oxide of the group A is oxidized. Specifically, oxygen separated from the oxide of the group B is bonded to the element of the oxide of the group A to form an oxide. Further, excess oxygen is bonded to the reducing agent. That is, the element of the oxide of the group B serves as a carrier that supplies oxygen to the element of the oxide of the group A, while the element of the reducing agent serves as a carrier that recovers excess oxygen. Accordingly, even if oxygen deficiency occurs in the oxide of the group A, such an oxide of the group A is supplied with oxygen separated from the oxide of the group B to become an oxide so as to be segregated and deposited at the grain boundaries, while excess oxygen is bonded to the reducing agent so as to be deposited at the grain boundaries without remaining in the crystals of the magnetic grains. Therefore, by obtaining the effect of isolation and miniaturization of the magnetic grains by the use of the oxide of the group A and by securely expelling the element of the oxide of the group A from the magnetic grains (depositing the element of the oxide of the group A at the grain boundaries) to prevent degradation of the crystal orientation, it is possible to improve the SNR. Since the role of the reducing agent is to adjust the amount of oxygen supplied from the group B, the magnitude relationship in ΔG between the reducing agent and the group A is not questioned.

On the other hand, greater oxygen deficiency occurs in the oxide of the group B so that the element of the oxide of the group B is discharged as simple atoms. There is a possibility that such an element of the oxide of the group B is entrapped into the magnetic grains. However, by selecting one of Co, Cu, Ag, W, and Ge as the element of the oxide of the group B, the crystal orientation is not degraded even when entrapped into the magnetic grains.

Since the reducing agent to be bonded to excess oxygen is selected from the group C including the oxides each having a composition in which oxygen is deficient from the oxide adapted to be contained in the grain boundaries, such as, for example, SiO, TiO, $Cr_2O_2$, and $Cr_3O_3$, the reducing agent with the excess oxygen is expelled to the grain boundaries. Therefore, it is possible to prevent degradation of the crystal orientation of the magnetic grains otherwise caused by the reducing agent entrapped in the magnetic grains and thus to supply the reducing agent while ensuring the SNR.

Example

Using an evacuated film forming apparatus, the layers from the adhesive layer 112 to the auxiliary recording layer 124 were formed in sequence on the disk substrate 110 in an Ar atmosphere by a DC magnetron sputtering method. As regards pressure on forming the films on sputtering, 0.6 Pa was used except where specifically noted and 3 Pa was used for forming the film of the magnetic recording layer 122. The composition of the adhesive layer 112 was 50Cr-50Ti (10 nm). In the soft magnetic layer 114, the composition of the first soft magnetic layer 114a and the second soft magnetic layer 114c was 92(60Co-40Fe)-5Zr-3Ta (each 20 nm) and the composition of the spacer layer 114b was Ru (0.7 nm). The composition of the pre-underlayer 116 was a NiW 93Ni-7W alloy (8 nm) with a fcc structure. As the first underlayer 118a, a Ru film of 10 nm was formed in an Ar atmosphere at a predetermined pressure (low pressure: e.g. 0.6 Pa to 0.7 Pa). As the second underlayer 118b, a Ru film of 10 nm was formed, using a target containing oxygen, in an Ar atmosphere at a pressure (high pressure: e.g. 4.5 Pa to 7 Pa) higher than the predetermined pressure. The composition of the nonmagnetic granular layer 120 was nonmagnetic 88(50Co-50Cr)-12($SiO_2$). In the first magnetic recording layer 122a, grain boundaries contain $Cr_2O_3$ as an example of an oxide and 95(70Co-12Cr-18Pt)-5($Cr_2O_3$) of 2 nm was formed. In the second magnetic recording layer 122b, grain boundaries contain the oxides of the groups A and B and the oxide (the reducing agent) of the group C. By changing the composition and presence/absence thereof as described below, Examples and Comparative Examples were prepared. The composition of the auxiliary recording layer 124 was 62Co-18Cr-15Pt-5B (5.6 nm). The protective layer 126 of 4 nm was formed using $C_2H_4$ and CN by the CVD method. The lubricating layer 128 of 1 nm was formed using PFPE by the dip coating method.

Now, examining will be made about the effectiveness of Examples in which the oxide (reducing agent) of the group C according to this embodiment was added. In the manner which is described above, in the perpendicular magnetic recording medium according to this embodiment, the oxide of the group B serving as the oxidizing agent and the oxide of the group C serving as the reducing agent ware contained in the magnetic recording layer 122 (in the second magnetic recording layer 122b in detail). For example, $Co_3O_4$ may be used as the oxide of the group B serving as the oxidizing agent and SiO may be used as the oxide of the group C serving as the reducing agent.

For example, when 1 mol % $Co_3O_4$ is added, assuming that all oxygen atoms are separated as simple atoms, 4 mol % oxygen atoms are discharged. In this event, it is assumed that the SNR is improved as compared with the case where no oxidizing agent or reducing agent is added. When 1 mol % SiO as the reducing agent is added, assuming that all SiO becomes $SiO_2$, simple atom oxygen decreases to 3 mol %. In this event, when a value of the SNR at a point where 1 mol % $Co_3O_4$ is added, namely, at a point where 4 mol % oxygen atoms are added to the second magnetic recording layer 122b passes a peak where the value of the SNR delineates with increase of the addition amount of $Co_3O_4$, it is considered that is possible to improve, by adding SiO, the value of the SNR up to the value near to the peak by decreasing the addition amount of oxygen atoms to the magnetic recording layer 122.

The compositions, the peak positions, and so on provided in the above-mentioned description are only illustrative and are properly changed depending on the composition of the entire magnetic recording layer. However, what is important here is that the desired amount of simple atom oxygen can be discharged into the film by jointly using the oxidizing agent of the group B and the reducing agent of the group C. This makes it possible to properly supplement, neither too much nor too little, deficient oxygen, i.e. oxygen which becomes insufficient due to oxygen deficiency, and thus to allow the originally expected function of the magnetic recording layer 122 to be sufficiently exhibited.

Figure 4A:
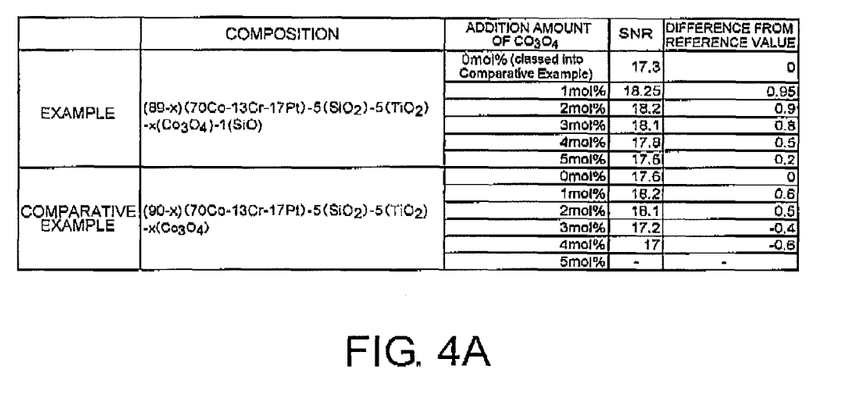
FIGS. 4A and 4B are diagrams for explaining the effectiveness of Examples each in which SiO serving as an oxide of a group C was added.
Figure 4B:
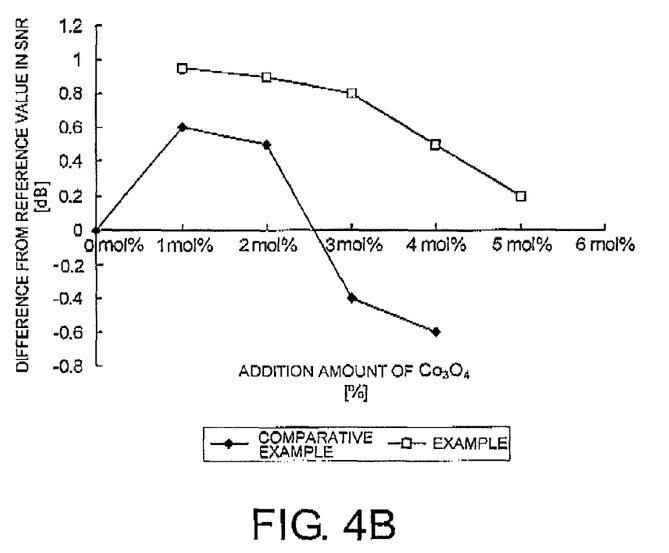

FIGS. 4A and 4B are diagrams for explaining the effectiveness Examples each in which SiO serving as the oxide of the group C according to this embodiment was added. FIG. 4A is a table showing compositions of the magnetic recording layer 122 (the second magnetic recording layer 122b in detail) according to Examples and Comparative Examples and measured values of the SNR thereof. FIG. 4B is a graph showing the measured values of the SNR of FIG. 4A and is a graph where the Examples and the Comparative Examples are normalized when the measured value in a case where $Co_3O_4$ is 0 mol % is used as a reference value. In FIG. 4A, the values of Examples and Comparative Examples are listed vertically. Although the composition in a case where $Co_3O_4$ is 0 mol % (SNR=17.3) is classed as one of the Comparative Examples for the Examples, normalization of the Examples uses its value as the reference value. In FIG. 4B, the abscissa axis represents the addition amount of $Co_3O_4$ added as the oxide of the group B and the ordinate axis represents the SNR.

As shown in FIG. 4A, tests ware performed so that the compositions of the Examples ware (89-x)(70Co-13Cr-17Pt)-5($SiO_2$)-5($TiO_2$)-x($Co_3O_4$)-1(SiO) and the addition amount (x=mol %) of $Co_3O_3$ was changed in succession. Tests ware preformed so that the compositions of the Comparative Examples ware (90-x)(70Co-13Cr-17Pt)-5($SiO_2$)-5($TiO_2$)-x($Co_3O_4$) and the addition amount (x=mol %) of $Co_3O_4$ was changed in succession as with the Examples. The film compositions except for the second magnetic recording layer 122b ware compositions similar in both of the Examples and the Comparative Examples.

First, referring to Comparative Examples in FIG. 4B, the SNR was improved by adding 1 mol % $Co_3O_4$. This is considered to be because, in film formation using a target containing an oxide such as $SiO_2$, by adding $Co_3O_4$ having larger Gibbs free energy $\Delta G$ (unstable) than $SiO_2$, $Co_3O_4$ is separated so that O (oxygen atoms) is supplied in the film and oxidizes Si and Cr in the form of simple atoms to accelerate the separation of the magnetic grains. In addition, this is considered to be because Co separated from the added $Co_3O_4$ enters in the interior of the magnetic grains to increase an output of the magnetic recording layer 122.

However, when the addition amount of $Co_3O_4$ became 2 mol % or more, there is a tendency that the SNR was sharply lowered. This is considered to be because when the addition amount of $Co_3O_4$ becomes 2 mol % or more, 0 and Co separated from $Co_3O_4$ are supplied excessively to the magnetic grains so that Cr in the magnetic grains is oxidized excessively to strengthen the interaction between the magnetic grains and so that noises increase caused by excessive amount of Co in the magnetic grains and so on and thus the SNR is lowered. At the time of adding $Co_3O_4$ at 3 mol %, the value of the SNR is lowered than the reference value where the addition amount of $Co_3O_4$ is 0 mol %.

Since the peak of SNR appeared when the addition amount of $Co_3O_4$ was 1 mol %, the true peak was considered to exist at 0 to 1 mol %. In other words, it can be considered that the addition amount is already excessive at the time of adding $Co_3O_4$ at 1 mol %.

On the other hand, referring to the Examples, the SNR was improved by adding 1 mol % $Co_3O_4$ as with the Comparative Examples. However, there is more, the value of SNR in the Example where the addition amount of $Co_3O_4$ is 1 mol % beyond the value of SNR in the Comparative Example where the addition amount of $Co_3O_4$ is 1 mol %. In the Examples, although $Co_3O_4$ was added by 3 mol %, the value of SNR thereof is higher than the reference value of 17.3 dB by about 0.8 dB and has 18.1 dB which satisfies condition that the SNR is more than 18.0 dB required for high recording density in general. Even if $Co_3O_4$ was added by 5 mol %, sudden reduction of SNR as with the Comparative Examples did not present. These are considered to be because, by making SiO serve as the reducing agent for $Co_3O_4$, supply of O to the magnetic grains due to $Co_3O_4$ is minutely controlled and SNR having the value near to the above-mentioned true peak of SNR that may be considered to exist at 0 to 1 mol % is exerted.

As described above, from FIGS. 4A and 4B, it is understood that it is possible to minutely control supply amount of oxygen atoms by using film forming of the magnetic recording layer 122 by combining $Co_3O_4$ serving as the oxidizing agent with SiO serving as the reducing agent and it is possible to supply oxygen atoms having further proper amount. Inasmuch as it is possible to, by adding SiO, prevent SNR from sudden reducing caused by increase of the addition amount of $Co_3O_4$, it will be expected that stability is enhanced on forming the film of the magnetic recording layer 122 and on producing the perpendicular magnetic recording medium 100.

Figure 5A:
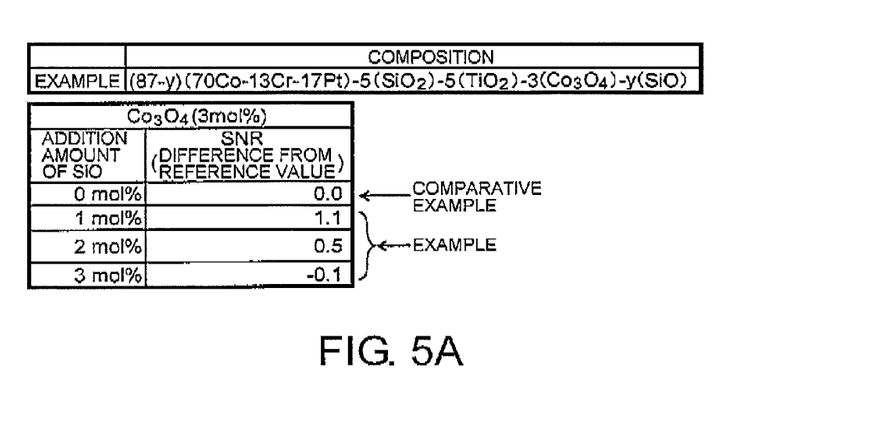
FIGS. 5A and 5B are diagrams for further explaining the effectiveness of Examples each in which SiO serving as an oxide of a group C was added.
Figure 5B:
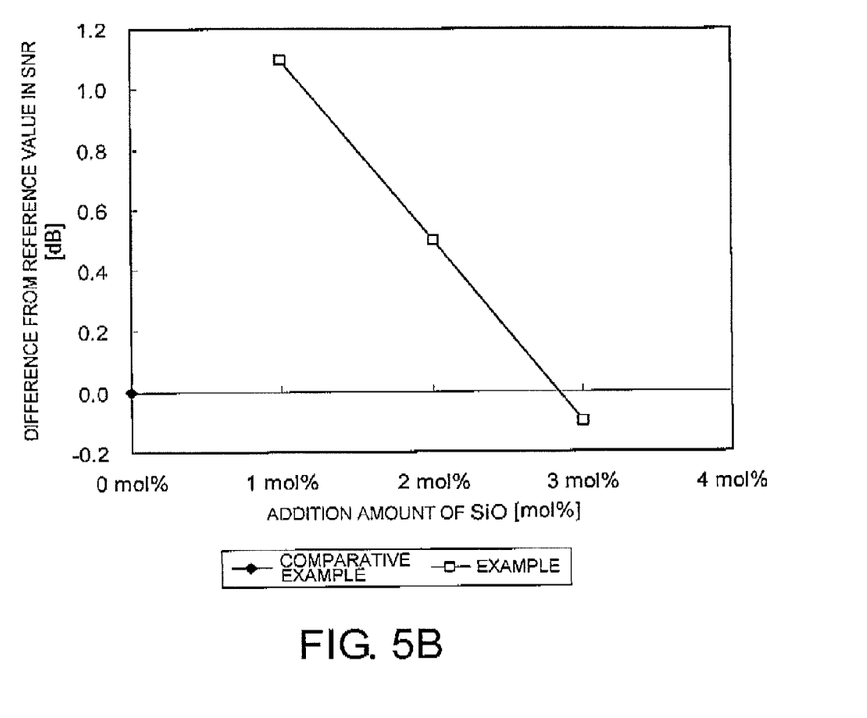

FIGS. 5A and 5B are diagrams for further explaining the effectiveness of Examples each in which SiO serving as the oxide of the group C according to this embodiment was added. FIG. 5A is a table showing compositions of the magnetic recording layer 122 (thee second magnetic recording layer 122b) according to Examples and measured values of the SNR thereof. FIG. 5B is a graph showing the measured values of the SNR of FIG. 5A. In FIG. 5B, the abscissa axis represents the addition amount of SiO added as the oxide of the group C and the ordinate axis represents the SNR. In FIGS. 5A and 5B, as with FIGS. 4A and 4B, the measured value of SNR in a case where $Co_3O_4$ is 0 mol % is used as a reference value and respective values of SNR are normalized.

FIGS. 5A and 5B show transition of the values of SNR by changing the addition amount (y=mol %) of SiO in regard to the Example in a case where $Co_3O_4$ was added by 3 mol % in FIGS. 4A and 4B. The compositions of the Examples were (87-y)(70Co-13Cr-17Pt)-5($SiO_2$)-5($TiO_2$)-3($Co_3O_4$)-y(SiO) as illustrated in FIG. 5A. In FIG. 5A, a Comparative Example was a case where the addition amount (y=mol %) of SiO was 0 mol %.

As shown in FIG. 56, by adding 1 mol % SiO, the SNR of the Examples ware improved than that of the Comparative Example. When the addition amount of SiO is equal to 2 mol % or more, there is a tendency that the value of SNR is reduced. When the addition amount of SiO increases up to 3 mol %, the value of SNR is lowered to a value which is nearly equal to that in a case where the addition amount of SiO is 0 mol %. This is considered to be because separation acceleration action of the magnetic grains due to $Co_3O_4$ is lost when the addition of SiO becomes an excessive amount.

From FIGS. 5A and 5B, it is understood that, in a target in which $Co_3O_4$ is added by 3 mol %, it is possible to improve the SNR if the addition amount of SiO lies in at least a range between 0 mol % and 2 mol %.

As described above, in the Examples, the SNR was improved by not only adding $Co_3O_4$ serving as the oxidizing agent but also adding SiO serving as the reducing agent. This is considered to be because, by adding SiO having smaller Gibbs free energy ΔG than $Co_3O_4$, the SNR can be further improved by adsorbing excess O produced from $Co_3O_4$ to SiO to thereby minimize oxidation of Cr forming magnetic grains.

As described above, by containing, in a target for forming a magnetic recording layer, the oxide of the group A adapted to mainly form grain boundaries, the oxide of the group B including the oxides each having larger Gibbs free energy ΔG than the group A, and the oxide of the group C including the oxides each having smaller Gibbs free energy ΔG than the group B, it was possible to improve the crystal orientation of a magnetic recording medium and to improve the SNR. Herein, the oxide of the group C preferably has oxygen deficiency smaller in number than the number of oxygen to be released from the oxide of the group B. In particular, in the case where the number of oxygen to be released from the oxide of the group B and the number of oxygen to be adsorbed by the oxide of the group C differ from each other, it is possible to finely adjust the final number of oxygen when the oxide of the group B or C is added per unit amount (e.g. unit mol %).

While the preferred embodiment of this invention has been described with reference to the accompanying drawings, it is needless to say that this invention is not limited thereto. It is apparent that a person skilled in the art can think of various changes and modifications in the category described in claims and it is understood that those also naturally belong to the technical scope of this invention.

INDUSTRIAL APPLICABILITY

This invention is applicable to a perpendicular magnetic recording medium adapted to be mounted in a perpendicular magnetic recording HDD (hard disk drive) or the like and to a method of manufacturing such a perpendicular magnetic recording medium.

What is claimed is:

1. A perpendicular magnetic recording medium comprising:
   a substrate,
   at least a magnetic recording layer with a granular structure in which a nonmagnetic grain boundary is formed between magnetic grains continuously grown into a columnar shape,
   wherein said magnetic grains contain Co, Cr, and Pt, and said magnetic recording layer contains
     at least one oxide selected from a group A comprising $SiO_2$, $TiO_2$, and $Cr_2O_3$,
     at least one oxide selected from a group B consisting of oxides each having a larger Gibbs free energy ΔG than said group A, and
     at least one oxide selected from a group C consisting of oxides each having a smaller Gibbs free energy ΔG than said group B, and
   wherein said magnetic recording layer is made of CoCrPt—$TiO_2$—$SiO_2$—$Co_3O_4$—SiO.

2. A perpendicular magnetic recording medium manufacturing method comprising:
   forming a magnetic recording layer over a substrate by the use of a target containing a metal containing Co, Cr, and Pt, at least one oxide selected from a group A, which is operative to form grain boundaries, comprising $SiO_2$, $TiO_2$, and $Cr_2O_3$, at least one oxide selected from a group B, which is operative to supplement oxygen deficiencies, consisting of oxides each having a larger Gibbs free energy ΔG than said group A, and at least one oxide selected from a group C, which is operative as a reducing agent, consisting of oxides each having a smaller Gibbs free energy ΔG than said group B,
   wherein said magnetic recording layer is made of CoCrPt—$TiO_2$—$SiO_2$—$Co_3O_4$—SiO.

3. A perpendicular magnetic recording medium comprising:
   a substrate,
   at least a magnetic recording layer with a granular structure in which a nonmagnetic grain boundary is formed between magnetic grains continuously grown into a columnar shape,
   wherein said magnetic grains contain Co, Cr, and Pt, and said magnetic recording layer contains
     at least one oxide selected from a group A, which is operative to form grain boundaries, comprising $SiO_2$, $TiO_2$, and $Cr_2O_3$,
     at least one oxide selected from a group B, which is operative to supplement oxygen deficiencies, consisting of oxides each having a larger Gibbs free energy ΔG than said group A, and
     at least one oxide selected from a group C, which is operative as a reducing agent, consisting of oxides each having a smaller Gibbs free energy ΔG than said group B,
   wherein the oxides of said group B are each at least one compound selected from a group comprising CoO, $Co_3O_4$, CuO, $Ag_2O$, and $WO_3$, and
   wherein $Co_3O_4$ is used in Group B and the amount of $Co_3O_4$ is 2 mol % or less.

4. The perpendicular magnetic recording medium of claim 1, wherein the amount of $Co_3O_4$ is 2 mol % or less.

5. The perpendicular magnetic recording medium according to claim 3, wherein the oxides of said group C are each at least one compound selected from a group comprising SiO, TiO, and $Cr_2O_2$, and $Cr_3O_3$.

6. The perpendicular magnetic recording medium manufacturing method according to claim 2, wherein the oxides of said group C are each at least one compound selected from a group comprising SiO, TiO, and $Cr_2O_2$, and $Cr_3O_3$.

7. The perpendicular magnetic recording medium manufacturing method according to claim 2, wherein the oxides of said group B are each at least one compound selected from a group comprising CoO, $Co_3O_4$, CuO, $Ag_2O$, and $WO_3$.

* * * * *